(12) United States Patent
Doumet

(10) Patent No.: US 6,183,244 B1
(45) Date of Patent: Feb. 6, 2001

(54) CONTROL OF CEMENT CLINKER PRODUCTION IN A WET PROCESS ROTARY KILN BY ANALYSIS OF SULFUR IN THE END PRODUCT

(75) Inventor: Joseph Doumet, Jdeideh El-Mein (LB)

(73) Assignee: Cement Petcoptimizer Company (VG)

( * ) Notice: Under 35 U.S.C. 154(b), the term of this patent shall be extended for 0 days.

(21) Appl. No.: 09/406,097

(22) Filed: Sep. 27, 1999

Related U.S. Application Data

(60) Provisional application No. 60/129,174, filed on Apr. 14, 1999.

(51) Int. Cl.$^7$ ........................................... F27B 9/40
(52) U.S. Cl. .................. 432/37; 432/14; 432/58; 432/106; 106/752; 106/758
(58) Field of Search ................ 432/14, 37, 58, 432/106; 106/752, 755, 757, 758, 765

(56) References Cited

U.S. PATENT DOCUMENTS

| | | |
|---|---|---|
| 3,916,025 | 10/1975 | Kunin ................................. 423/242 |
| 4,022,629 | 5/1977 | Garrett et al. . |
| 4,024,220 | 5/1977 | Ostroff et al. ....................... 423/242 |
| 4,065,320 | 12/1977 | Heian et al. ......................... 106/100 |
| 4,080,218 | 3/1978 | Mori et al. . |
| 4,110,121 | 8/1978 | Rechmeier et al. . |
| 4,329,180 | 5/1982 | Herchenbach et al. . |
| 4,372,784 | 2/1983 | Hess . |
| 4,421,563 | 12/1983 | Cosar ................................. 432/14 |
| 4,465,460 | 8/1984 | Cosar ................................. 423/106 |
| 4,495,162 | 1/1985 | Jons et al. ........................... 423/171 |
| 4,504,319 | 3/1985 | Wolter et al. . |
| 4,508,573 | 4/1985 | Harris . |
| 4,600,438 | 7/1986 | Harris . |
| 4,662,945 | 5/1987 | Luwall ................................ 106/100 |
| 4,678,514 | 7/1987 | Deyhle et al. . |
| 4,715,811 | 12/1987 | Lawall . |
| 4,774,064 | 9/1988 | Arnold et al. . |
| 4,913,742 | 4/1990 | Kwech . |
| 4,952,147 | 8/1990 | Boyden, II et al. . |
| 4,993,942 | 2/1991 | Boyden, II et al. . |
| 5,066,474 | 11/1991 | Laird . |
| 5,098,285 | 3/1992 | Bauer . |
| 5,132,102 | * 7/1992 | Cohen et al. ........................ 432/14 |
| 5,156,676 | 10/1992 | Garrett et al. . |
| 5,336,317 | 8/1994 | Beisswenger et al. .............. 106/758 |
| 5,356,472 | 10/1994 | Odler ................................. 106/734 |
| 5,377,603 | 1/1995 | Reese et al. . |
| 5,380,505 | 1/1995 | College .............................. 423/175 |
| 5,556,459 | 9/1996 | Cohen et al. . |
| 5,572,938 | 11/1996 | Leger . |
| 5,626,667 | 5/1997 | Böhle . |
| 5,632,616 | 5/1997 | Tutt et al. . |
| 5,766,339 | 6/1998 | Babu et al. . |
| 5,769,940 | 6/1998 | College . |
| 5,820,814 | 10/1998 | Doumet . |
| 5,833,453 | 11/1998 | Doumet . |
| 5,842,853 | 12/1998 | Böhle . |
| 5,882,190 | 3/1999 | Doumet . |
| 5,954,499 | 9/1999 | Jessen . |
| 5,971,302 | 10/1999 | Doumet . |
| 5,972,104 | 10/1999 | Doumet . |
| 5,975,891 | 11/1999 | Hundebøl . |
| 6,012,918 | 1/2000 | Doumet . |

* cited by examiner

Primary Examiner—Pamela Wilson
Assistant Examiner—Gregory A. Wilson
(74) Attorney, Agent, or Firm—Fish & Richardson, P.C.

(57) ABSTRACT

An apparatus for producing cement clinker using a high sulfur fuel includes a wet rotary kiln, at least one sulfur analyzer, a controller, and a burner. The wet rotary kiln has a first end and a second end and processes a slurry of a raw material mixed with a certain quantity of coarse grinded high sulfur fuel received at the first end to produce cement clinker. The sulfur analyzer is produces a measure of the sulfur content of the cement clinker. The controller receives the measure from the sulfur analyzer and controls a concentration of oxygen in the kiln based on the measured sulfur content in the clinker end product. The burner is installed in the kiln at the second end and operates to burn a high sulfur fuel.

36 Claims, 4 Drawing Sheets

CONTROL OF CEMENT CLINKER PRODUCTION IN A WET PROCESS ROTARY KILN BY ANALYSIS OF SULFUR IN THE END PRODUCT

CROSS REFERENCE TO RELATED APPLICATIONS

This application claims priority from U.S. Provisional Application No. 60/129,174, titled "CONTROL OF CEMENT CLINKER PRODUCTION IN A WET PROCESS ROTARY KILN BY ANALYSIS OF SULFUR IN THE END PRODUCT", filed Apr. 14, 1999, and U.S. application Ser. No. 09/268,676, titled, "CONTROL OF CEMENT CLINKER PRODUCTION BY ANALYSIS OF SULFUR IN THE END PRODUCT", filed Mar. 16, 1999, which is a continuation of U.S. Pat. No. 5,882,190, titled, "CONTROL OF CEMENT CLINKER PRODUCTION BY ANALYSIS OF SULFUR IN THE END PRODUCT", filed Dec. 2, 1997 and issued on Mar. 16, 1999.

TECHNICAL FIELD

The invention relates to producing cement clinker using high sulfur fuel.

BACKGROUND

Cement clinker is produced by sintering a raw material, such as limestone mixed with silica alumina and ferrous or ferrique oxide, that is homogenized and fed into a rotary kiln. The production may take place using a dry, semi-wet, or wet process, where the type of process refers to the amount of water added to the raw material. In the dry process, dried limestone, the raw material, passes through a series of cyclones and preheaters that heat the raw material, and a precalciner that further preheats and precalcines the raw material. The heated and precalcined raw material then enters a rotary kiln in which it is sintered in a sinterization or klinkerization reaction to form cement clinker. The cement clinker is then cooled in a grate cooler and discharged.

In a wet process, the raw material is mixed with water to form a slurry having a water content of approximately 35–40%. The slurry then is passed through a long rotary kiln having a series of different zones (or chambers) of reaction to form cement clinker.

A typical wet process kiln has a fuel consumption per kilogram ("kg") of clinker produced of between 1,300 and 1,500 kilocalories ("kcal"), depending on the water content of the slurry fed to the kiln. The fuel consumption is approximately 175% of the consumption of a dry process rotary kiln that is equipped with a preheater and precalciner. A kiln having a capacity to produce 1,500 tons of clinker per day typically has a diameter of between four and five meters and a length of between 135 and 150 meters.

The semi-wet process of producing cement clinker involves using a slurry of raw material and water in which the water content is in the range of approximately 15% to 20%. The kiln is equipped with filters that remove a portion of the water through a process known as slurry dewatering.

SUMMARY

In one general aspect, an apparatus for producing cement clinker using a high sulfur fuel includes a wet rotary kiln, at least one sulfur analyzer, a controller, and a burner installed in the kiln. The wet rotary kiln has a first end and a second end and is operable to process a slurry of a raw material and water received at the first end to produce cement clinker. The sulfur analyzer is operable to produce a measure of the sulfur content of the cement clinker. The controller is operable to receive the measure from the sulfur analyzer and to control a concentration of oxygen in the kiln based on the measured sulfur content. The burner is installed in the kiln at the second end and is operable to burn a high sulfur fuel.

Embodiments may include one or more of the following features. For example, the apparatus may include an exhauster mounted to the kiln at the first end and operable to pull air through the kiln, and the controller may be operable to control the concentration of oxygen in the kiln by controlling the speed of the exhauster based on the measured sulfur content. The controller may be operable to control the concentration of oxygen in a sintering zone of the kiln by controlling the speed of the exhauster based on the measured sulfur content.

The high sulfur fuel may contain less than 4.5% sulfur and, in some implementations, may contain approximately 4.5% to 7% sulfur. The slurry may include approximately 35% to 40% water in a wet rotary kiln and approximately 18% to 20% water in a semi-wet rotary kiln.

The slurry further also may include a second high sulfur fuel. The second high sulfur fuel may contain more than approximately 4.5% sulfur and, in some implementations, may contain approximately 4.5% to 7% sulfur.

The kiln may include a heating zone for heating the slurry, a decarbonation zone for decarbonating the slurry, and a reaction zone for reactions in the slurry. The second high sulfur fuel combusts and burns in the kiln in the heating zone, the decarbonation zone, and the reaction zone.

The apparatus may further include a variable speed weigh feeder to add the second high sulfur fuel to the slurry to form a mud, and a slurry feeder to feed the mud into the kiln at the first end. The speed of the weigh feeder is controlled by the controller to adjust a concentration of carbon monoxide in gases exiting the kiln. The kiln also may include a drying zone equipped with chains for heating and drying the slurry.

The kiln includes a sintering zone for sintering the raw material, and the oxygen provided in the kiln at the sintering zone may be up to 6% in excess, whereby the temperature at which there is a decomposition reaction of calcium sulfate is raised to approximately 1500° Celsius. The apparatus further includes a carbon monoxide analyzer operable to measure the carbon monoxide concentration in the gas flowing from the exhauster and the controller is operable to receive the carbon monoxide measure, to turn off the burner if the measured carbon monoxide concentration exceeds approximately 0.6%, and to maintain the carbon monoxide measure at a preset level by controlling the speed of the weigh feeder.

In another general aspect, a method of producing cement clinker using high sulfur fuel includes introducing a slurry of a raw material and water into a wet rotary kiln, combusting a high sulfur fuel in the wet rotary kiln, passing the mixture through the kiln in the presence of the combusting fuel so as to sinter the raw material to form a sintered material, measuring a sulfur content of the sintered material, and controlling an excess concentration of oxygen in the kiln based on the measured sulfur content.

Embodiments may include one or more of the following features. For example, the high sulfur fuel may contain more than approximately 4.5% sulfur and, in some implementations, may contain less than 7% sulfur. The method may further include feeding a second high sulfur fuel to the slurry of raw material and water to form a mud before introducing the mud into the kiln. The second high sulfur fuel may contain more than approximately 4.5% sulfur and, in some implementations, may contain approximately 4.5% to 7% sulfur. The mixture of water and raw material may contain approximately 35–40% water in a wet process and approximately 18–20% water in a semi-wet process.

The method may further include controlling a feed rate of the second high sulfur fuel added to the mixture to control the measured oxygen and carbon monoxide content of the gas exiting the kiln. The method may still further include measuring a carbon monoxide concentration to control a feed rate of the second high sulfur fuel introduced into the kiln. The method also may include combusting the second high sulfur fuel to consume at least a portion of the excess oxygen.

In the method, controlling the excess concentration of oxygen may include maintaining the concentration at a level up to approximately 4.5 to 6%. The excess concentration of oxygen in the kiln may be controlled to produce a sintered material having a $SO_3$ concentration less than approximately 3.5%.

The method also may include maintaining an oxidizing atmosphere in at least a portion of the kiln to reduce NOx emissions to a level below 200 mg per normal cubic meter. The method also may include maintaining a circulation of $SO_2$ in the kiln at less than 80 kg per hour to eliminate calcium sulfate and calcium sulfite deposits in the interior of the wet rotary kiln. The method may further include reducing the concentration of $SO_2$ in the kiln by creating $SO_3$ by using calcium sulfite ($CaSO_3$) as an intermediate oxidizing catalyst. The wet rotary kiln may include a sintering zone and controlling the oxygen concentration in the kiln may include providing excess oxygen in at least the sintering zone to prevent decomposition of calcium sulfate below approximately 1500° Celsius. In the method, the excess oxygen balances the sulfur entering the kiln and leaving in the sintered material.

The use of high sulfur fuel in a wet rotary kiln by controlling oxygen in the kiln's sintering zone based on sulfur in the cement clinker provides considerable advantages. Long wet rotary kilns and semi-wet rotary kiln are susceptible to blockage by calcium sulfate and calcium sulfite ring formations. Due to this potential for blockage, the kiln is very sensitive to the percentage of sulfur contained in the fuel burned in the mud and at the burner. For this reason, conventional long wet rotary kilns use fuels containing less than 2% sulfur to reduce the blockage incidents. By contrast, the new technique permits use of fuels that contain up to approximately 7% sulfur when the fuel is added to a slurry of raw material containing approximately 35% to 40% water or dewatered raw material containing 18–20% water.

By increasing the concentration of oxygen in highest temperature of the process 4.5% to 6%, the temperature at which calcium sulfate ($CaSO_4$) decomposes increases to a temperature greater than the sintering temperature in the sintering zone of the kiln. This causes the $CaSO_4$ to become a component of the finished product rather than to decompose and form deposits in the kiln that can stop production.

As another advantage, heating, decarbonation, and reaction zones of the process may be reduced in length over conventional long wet rotary kilns because the fuel mixed with the raw material combusts in those zones with increased efficiency relative to conventional long wet rotary kilns. This reduces the overall length and cost of the kiln. Alternatively, the rate of production of the kiln may be increased approximately 15% to 20%.

As another advantage, the cement clinker produced contains sufficient levels of calcium sulfate so that gypsum need not be added while grinding the cement clinker to produce cement for regulating the setting time. Because the sulfur in the fuel becomes a part of the cement clinker, the $SO_2$ emissions are reduced.

In addition, because the excess of oxygen at the sintering zone is used at the decarbonation zone of the kiln by the combustion of the fuel mixed with the raw material, the concentration of NOx in the exhaust gases vented by the exhauster is at a minimum.

Other features and advantages will be apparent from the following description, including the drawings, and from the claims.

DESCRIPTION

Figure 1:
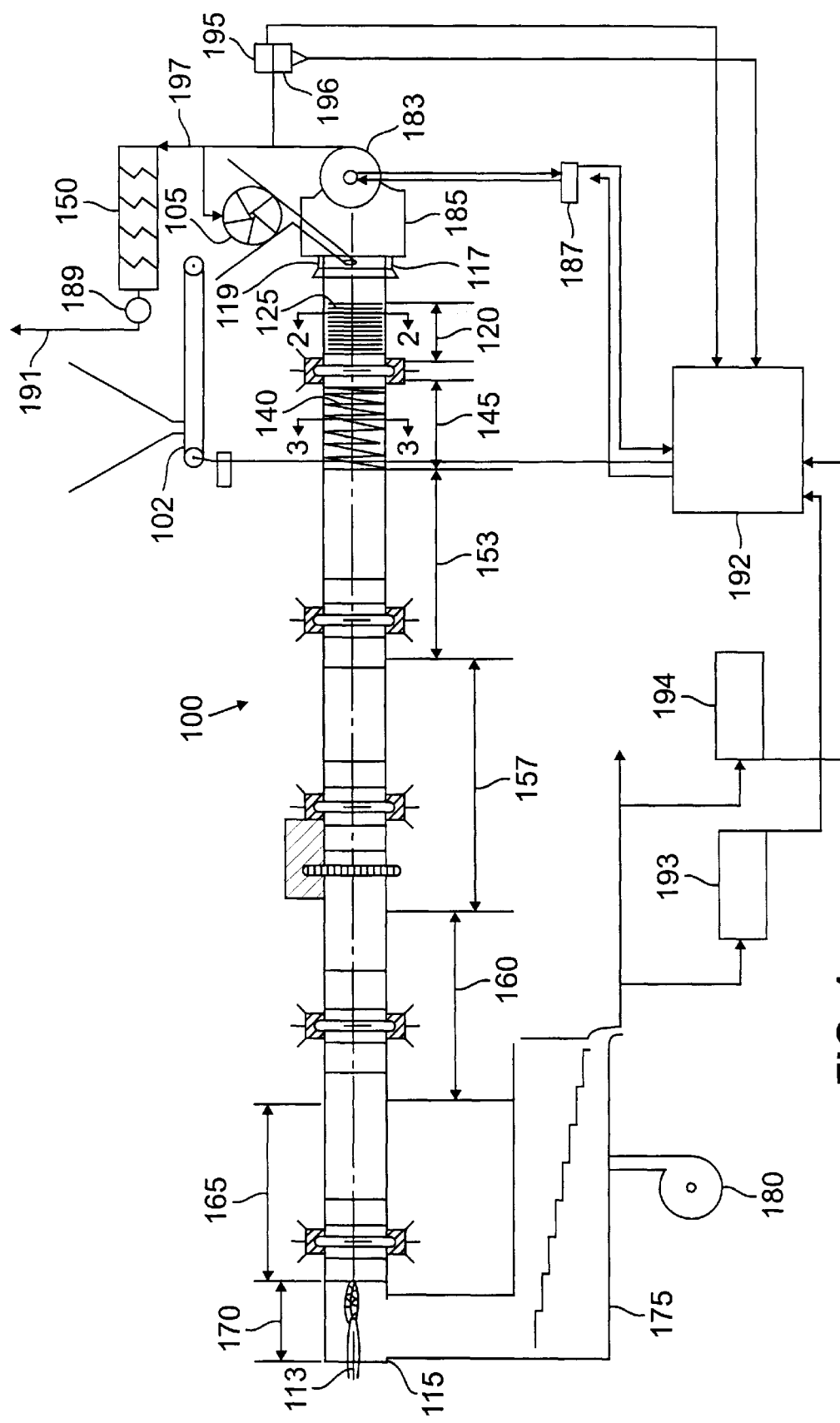
FIG. 1 is a front view of a long, wet-cement-process, rotary kiln and supporting equipment for using high sulfur fuel.

Referring to FIG. 1, in a wet process using a long rotary kiln 100 and operated with a high sulfur fuel, a raw material, such as limestone mixed with silica, alumina and iron oxide is mixed with water while being ground to form a slurry that contains approximately 35–40% water. A fuel, such as petroleum coke or coal that are high in sulfur content (i.e., up to approximately 7%) is fed from a weigh feeder 102 into a slurry feeder 105 mounted underneath a slurry hopper (not shown). As described more fully below, a second fuel is provided to the kiln at a burner 113 located at a second end 115 of the kiln 100. The fuel mixed with the slurry is coarsely ground to pellet sizes having a diameter, for example, of approximately 0.5 mm to 1.0 mm. The slurry fed into the slurry feeder 105 mixes with the high sulfur fuel to form a mud. The speed of the slurry feeder 105 controls the rate at which mud is fed into the rotary kiln 100 at a mud chamber or zone 117, which is at a first end 119 of the rotary kiln 100.

Figure 2:
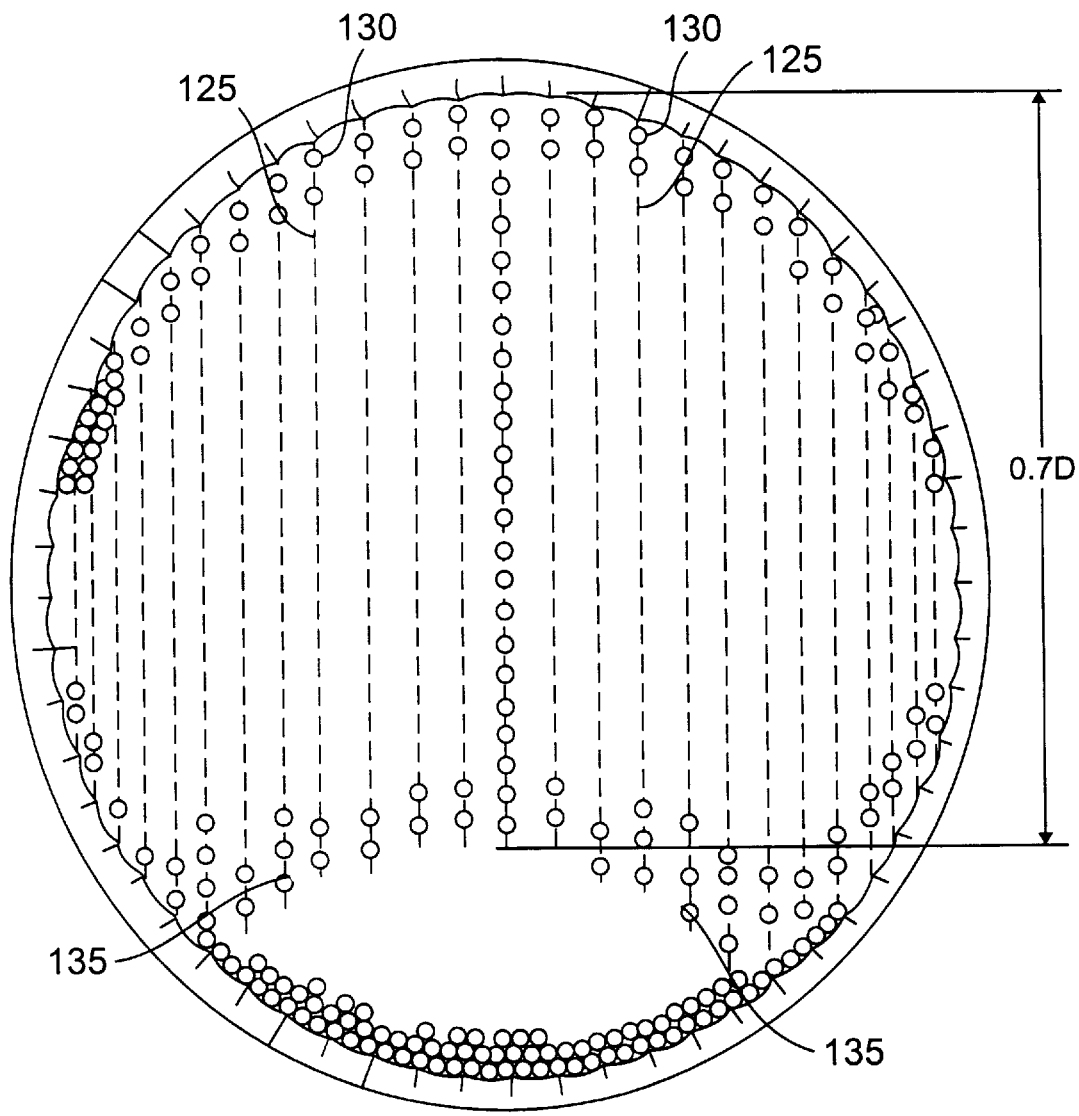
FIG. 2 is a cross-sectional view of the kiln of FIG. 1 taken at line 2—2 showing curtain chains.

Referring also to FIG. 2, the mud flows from the mud zone 117 into a chamber or zone 120 that contains curtain chains 125. Each curtain chain 125 has a length that is approximately seventy percent of the inner diameter of the kiln at zone 120. Each curtain chain 125 has a first end 130 attached to the inner diameter of the zone 120 and a free, unattached second end 135. The curtain chains are installed around the entire inner diameter of the zone, and along the entire length of the zone 120.

The mud covers the curtain chains as it flows through the zone 120. Because the kiln is rotating, the curtain chains are completely immersed in the mud during part of the rotation. This immersion causes the curtain chains 125 to be heavily covered with mud.

As described in more detail below, a stream of hot gases continuously flows through the kiln 100. These hot gases heat the curtain chains 125 and dry the mud on the curtain chains. Because the entire inner diameter of the zone 120 is lined with curtain chains, the curtain chains form a continuous curtain covering a majority of the cross-section of the chamber as the kiln rotates. For this reason, the curtain chains 125 are continuously heated by the hot gases and function as a heat exchanger between the hot gases flowing through the kiln 100 and the mud to heat and dry the mud.

As the mud dries, it becomes more viscous and flows with more resistance through the kiln 100. The kiln is sloped to cause flow through the kiln. The typical slope of a kiln is approximately 3%.

Figure 3:
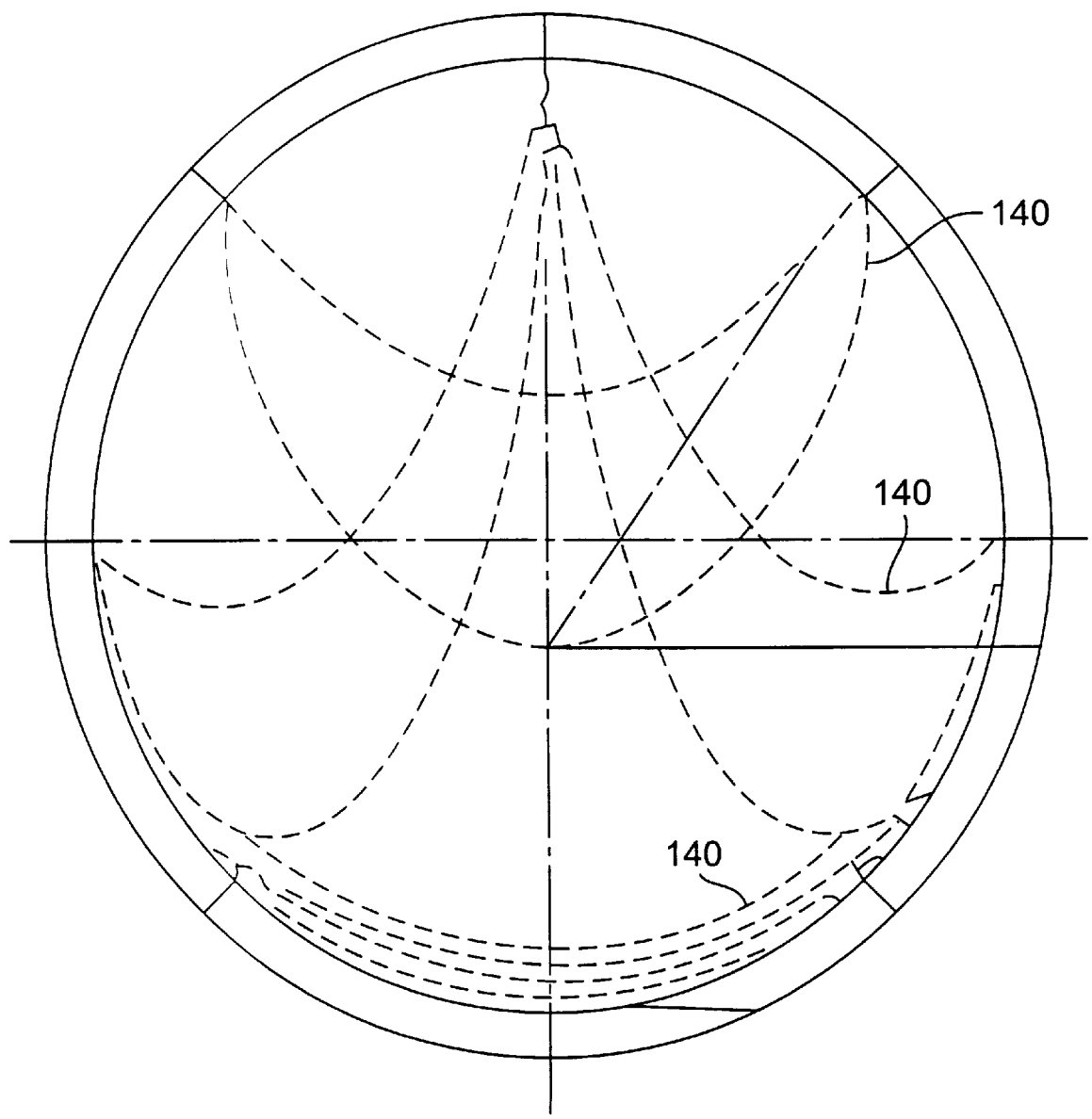
FIG. 3 is a cross-sectional view of the kiln of FIG. 1 taken at line 3—3 showing garland chains.

Referring also to FIG. 3, to push the more viscous mud through the kiln 100, garland chains 140 are installed in a chamber or zone 145 adjacent to the zone 120. Each garland chain 140 has two ends attached to the inner diameter of the zone 145. Each garland chain 140 is attached to the inner diameter such that the ends are separated by approximately one-fourth to three-eighths of the circumference of the zone 145, with the ends also being longitudinally offset. With this arrangement, rotation of the kiln 100 causes the garland chains 140 to function like a worm conveyor that pushes the mud through the kiln 100. The garland chains 140 also function as a heat exchanger between the mud and the hot gases passing through the kiln. In particular, the garland chains 140 are heated by the hot gases and further heat and dry the mud so that the mud exiting the zone 145 is functionally dry.

Figure 4:
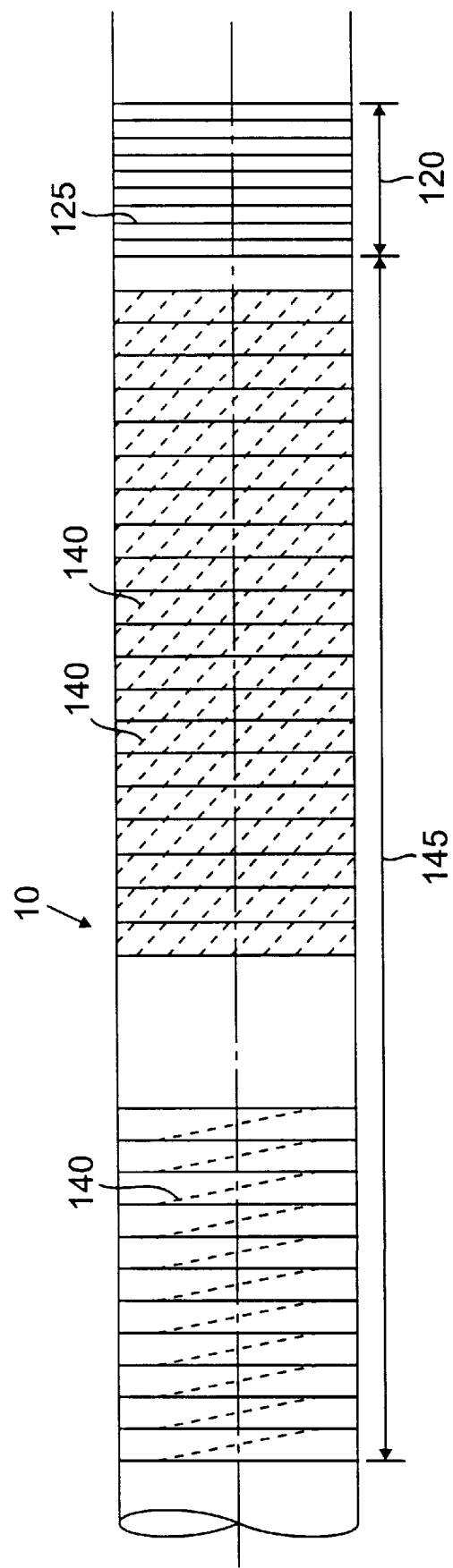
FIG. 4 is a partial front view of the kiln of FIG. 1 showing the arrangement of the curtain chains and garland chains of FIGS. 2 and 3, respectively.

Referring also to FIG. 4, in addition to heating and drying the mud, the garland chains 140 and the curtain chains 120, which are coated with the mud, function as a filter to capture most of the dust carried in the hot gases passing through the kiln 100. In particular, the dry dust adheres to the wet chains so that the garland chains 140 and the curtain chains 120 lower the dust load of the gases.

The hot gases flow toward the first end 119 of the kiln 100. After passing through the zone 145, the zone 120, and the mud or slurry zone 117, the hot gases enter an electrostatic precipitator 150 positioned adjacent to the first end 119 of the kiln 100.

Referring again to FIG. 1, the dried mud passes from zone 145 into a heating chamber or zone 153, in which the dried mud is heated to approach its decarbonation (deacidification) temperature. The dried mud reaches at least 700° Celsius in the heating zone 153 but may reach higher temperatures. In addition, the fuel component of the dried mud combusts and burns entirely or partially in the heating zone 153, which raises the temperature in the heating zone and speeds up the heating of the dry mud compared to heating without the combusting fuel.

The dried mud passes from the heating zone 153 into a decarbonation zone 157. The high sulfur fuel continues to combust and burn as it passes through the decarbonation zone 157. The burning fuel speeds up the decarbonation by providing extra heat in the decarbonation zone 157, in which the reaction is endothermic. After the raw material passes through the decarbonation zone 157, it has been completely calcined and is at a temperature in the range of approximately 950° Celsius to 1050° Celsius.

The decarbonated raw material passes from the decarbonation zone 157 into a reaction chamber or zone 160 in which various exothermic chemical reactions occur. Depending upon the speed at which the raw material passes through the heating zone 153 and the decarbonation zone 157, and if there is a sufficient quantity of high sulfur fuel in the decarbonated raw material, the fuel may continue to burn in the reaction zone 160. The temperature of the raw material in the reaction zone 160 is in the range of approximately 1000° Celsius to 1250° Celsius.

The raw material from the reaction zone 160 passes into a sintering or clinkerization zone 165. In the zone 165 the raw material reaches a temperature in the range of approximately 1400° Celsius to 1500° Celsius and is sintered. After it is sintered, the raw material, which is now clinker, passes through a burner zone 170 into a grate cooler 175. Cooling fans 180 in the grate cooler 175 blow cool air across the hot clinker to cool it. When the clinker is cooled, it is discharged.

The heat supplied to the kiln 100, to heat, dry and sinter the raw material is provided by burner 113 and the secondary air that cooled the clinker in the grate cooler 175. An exhauster 183 installed after a gas chamber or zone 185 pulls air into the kiln 100 through the grate cooler 175. The air pulled into the kiln 100 includes the air blown across the hot clinker in the grate cooler 175. This air is heated as it removes heat from the clinker. The quantity of air pulled through the kiln 100 is controlled by the speed of the exhauster 183, which is controlled by a speed control 187.

Although only air is pulled into the rotary kiln 100, its composition is changed by the combustion of the fuel and by the various chemical reactions occurring in the kiln, including the fuel burned at the burner 113; burned in the heating zone 153, decarbonation zone 157, and reaction zone 160; and the dust in the kiln.

Because of the quantity of dust collected, the hot gases exiting the kiln 100 into the exhauster 183 are directed to the electrostatic precipitator 150, which removes the dust from the gases. A secondary exhauster 189 removes the filtered gases from the electrostatic precipitator 150 to a stack 191. The dust from the electrostatic precipitator 150 is added to the hopper of wet mill (not shown) that produces the slurry that is mixed with the high sulfur fuel to form the mud fed to the kiln 100.

Just as the mud may contain high sulfur fuel, such as high sulfur petroleum coke or high sulfur coal, the burner 113 may burn high sulfur fuel, which increases the concentration of sulfur in the form of sulfur dioxide $SO_2$ that circulates in the gases in the kiln. The formed calcium sulfite as $CaSO_3$ by combination with the lime CaO of the raw material decomposes at a temperature greater than or equal to approximately 1000° Celsius. The increased sulfur dioxide recombining with the raw material, which contains approximately 65% CaO, at the end of the kiln where the temperature is low, affects the stability of the operation of the kiln because deposits and rings may form in the kiln. The CaO from the raw material combines with $SO_2$ to form calcium sulfite $CaSO_3$, which oxidizes to form calcium sulfate ($CaSO_4$). Calcium sulfate decomposes at temperatures at or above approximately 1200° Celsius. Calcium sulfate decomposes at approximately 1200° Celsius in the reaction $CaSO_4 \rightarrow SO_2 + CaO + \frac{1}{2}O_2$.

The increase in sulfur present in the kiln 100 creates a tendency for the calcium sulfite and the calcium sulfate to decompose and the $SO_2$ to react with the CaO in the raw material. These reactions increase the circulation of $SO_2$ in the process to an extent that it causes rings of calcium sulfite and calcium sulfate to form in the interior of the kiln. These rings may build up and stop the production of the kiln unless the calcium sulfate leaves the kiln as a component of the end product (i.e., the cement clinker).

The amount of decomposition of calcium sulfite and calcium sulfate can be reduced significantly by increasing the amount of oxygen present in the circulating gases flowing through the kiln 100. Excess oxygen prevents the decomposition by increasing the temperature at which calcium sulfate decomposes to approximately 1500° Celsius, which is slightly greater than the sintering temperature in the sintering zone 165. Preventing the calcium sulfate from decomposing ensures that it stays in the decarbonated raw material passing through the kiln 100 in sintering zone 165 so that it can form cement clinker. Thus, this calcium sulfate becomes a component of the cement clinker end product.

The amount of excess oxygen necessary to significantly reduce the calcium sulfate decomposition is in the range of approximately 4.5% to 6%. The excess oxygen is provided by forcing more air through the sintering zone 165 by increasing the speed of the exhauster 183. Because there is a relationship between the amount of excess oxygen and the extent of decomposition of calcium sulfate, the quantity of sulfur, in the form of calcium sulfate, present in the cement clinker produced (i.e, the end product) correlates well with the amount of sulfur entering the system in the fuels used and from any sulfur in the raw material.

The sulfur content in the end product can be calculated through the consumption of fuel in the burner and through the fuel fed with the slurry on a basis of tons of clinker produced. Knowing the output or production of clinker of the rotary kiln, the percentage of sulfur or $SO_3$ in the end product can be calculated. If the percentage of sulfur in the end product goes above the calculated percentage set in the controller 192, it does not necessarily indicate that too much excess oxygen is being provided. The excess of sulfur in the end product can result from disintegration of any coatings in the kiln, which would then pass into the end product, thereby leaving the kiln with the end product. This temporary occurrence increases the $SO_3$ or sulfur content in the end product above the level set in the controller 192. Thus, the controller is designed not to react until the $SO_3$ or sulfur in the end product returns to normal from a high value. However, if the $SO_3$ concentration goes below the set value for sulfur or $SO_3$ in the end product, the controller reacts by slowly increasing the speed of the exhauster 183 until the $SO_3$ concentration again reaches the set point in the controller.

The quantity of sulfur entering the process in the fuel and raw material should not be such that it causes the cement clinker to have an $SO_3$ concentration greater than an upper limit of 3% to 3.5% because the concentration of $SO_3$ in the end product typically is subject to cement specifications and standards covering the composition of cement clinker or cement. From the calculation of the sulfur in the raw material, and fuel consumed at the burner and added to the mud, the choice of the fuel and its corresponding sulfur content must be made such that the quantity of sulfur entering the process is known and the set point of $SO_3$ percentage in the end product as programmed in the controller is known and in conformance with cement clinker standards.

The excess oxygen in the kiln 100 and, the excess oxygen in the sintering zone 165, is used in the combustion of the coarsely ground fuel that is added to the slurry at the kiln inlet because that fuel burns in the decarbonation zone 157, heating zone 153 and, if still available, in reaction zone 160. The fuel burning in zones 157-153-160 lowers the formation of undesirable NOx compounds that otherwise might be formed in the sintering zone 165 by decomposing the NOx to nitrogen using the oxygen provided for combustion of the coarsely ground fuel. The NOx decomposition leads to a reduction in the concentration of NOx in the gases that reach the exhauster 183 to approximately 200 mg per normal cubic meter of gas. The atmosphere in the decarbonation zone 157 is slightly oxidizing and is controlled by a controller 192.

One way to provide excess oxygen to the kiln is by increasing the speed of the exhauster 183 that pulls air through the kiln 100. As illustrated in FIG. 1, the kiln 100 is supplied with the controller 192 that controls the speed of the exhauster 183 and the weigh feeder 102. The controller receives inputs from a pair of $SO_3$ analyzers, 193 and 194, respectively, that are used to analyze the quantity of sulfur trioxide in the clinker (i.e., the end product). The controller also receives inputs from an oxygen analyzer 195 and a carbon monoxide analyzer 196 positioned in a line 197 between the exhauster 183 and the electrostatic precipitator 150. Finally, the controller 192 receives as an input the speed of the exhauster 183 from the speed controller 187, which the controller 192 uses to adjust the excess of oxygen in sintering zone 165 and, at the same time, to adjust the quantity of added fuel in the mud to maintain a set point of carbon monoxide in the gases leaving the kiln.

As described above, the controller 192 varies the speed of the exhauster 183 to maintain the quantity of sulfur trioxide, which is indicative of the quantity of calcium sulfate in the cement clinker, at a set point of the controller box 192. If sulfur trioxide in the clinker is too high, the controller does not vary the speed of the exhauster 183 because coatings of calcium sulfite and calcium sulfate in the kiln can periodically disintegrate and mix with, and leave with, the clinker. This mixing temporarily increases the concentration of $SO_3$ in the end product. Controller 192 varies the speed of the exhauster 183 only if the $SO_3$ in the end product is at a concentration lower than the set point. Periodically, as programmed, the controller lowers the speed of exhauster 183 slightly to maintain the excess oxygen in the kiln and sintering zone at a level as low as possible, as needed, to ensure that all of the sulfur passes through the kiln in the end product. Because the quality of sulfur in fuel and mixed with the raw material is known, the maximum amount of $SO_3$ that can be discharged with the clinker end product can be calculated. The controller 192 uses this value to maintain the $SO_3$ concentration in the end product at a concentration close to the calculated one.

If the $SO_3$ concentration in the end product temporarily exceeds the set point, the controller alarms, which indicates that fuel with a lower sulfur content should be used. The controller 192, however, also indicates that such a change should be delayed. The concentration of $SO_3$ in the clinker can temporarily increase because of the disintegration of the coatings and rings in the kiln, which causes that material to pass through the kiln. Thus, if the coatings and rings are disintegrating, after a lapse of time the $SO_3$ percentage in the clinker will return to normal.

As noted above, the controller 192 receives inputs regarding the oxygen and carbon monoxide concentrations in the gases passing through the exhauster 183. The oxygen concentration measured by oxygen analyzer 195 is recorded for record-keeping purposes. If the oxygen analyzer 195 or the carbon monoxide analyzer 196 fail to provide a reading, the controller 192 sounds an alarm that indicates that the analyzers are blocked with dust and should be cleaned. The carbon monoxide concentration provided by the carbon monoxide analyzer 196 is used as a safety measure to control the operation of the kiln 100 to prevent an explosion of combustible gases in the electrostatic precipitator 150.

As described above, the exhauster 183 pulls an additional quantity of air into the kiln to provide excess oxygen to prevent calcium sulfate decomposition. The additional air increases the energy requirement in wet process kilns because of the excess oxygen. To minimize the additional energy consumed, the additional air is maintained at the minimum amount necessary to provide excess oxygen in the sintering zone 165 and prevent calcium sulfate decomposition. The excess oxygen in the sintering zone increases the energy needed to pull the excess oxygen through the sintering zone 165. The excess of oxygen is used by the ground fuel in the raw material in the decarbonation zone 157 and helps accelerate the decarbonation process. This acceleration increases the production of the wet rotary kiln, which thereby compensates for the extra energy consumed because decarbonation zone 157 becomes shorter, which increases the production of the kiln.

An increase in carbon monoxide concentration indicates an increased concentration of combustible gases. Because these gases may combust in the electrostatic precipitator 150, the solid fuel weigh feeder 102 is automatically turned off by the controller 192 when the carbon monoxide concentration reaches 0.6% of the gases passing through the exhauster 183. This carbon monoxide value is adjustable either up or down by the operator. If the carbon monoxide level measured at the exhauster remains above the set point the controller 192 turns off the burner 113. The burner 113 and the solid fuel weigh feeder 102 must be manually restarted at the controller 192.

At values below 0.6%, the carbon monoxide concentration is used by the controller 192 to vary the amount of high sulfur fuel added to the slurry. As the concentration of carbon monoxide approaches 0.6%, as set in the controller, the speed of the weigh feeder 102 is decreased to supply less fuel to the mud in the kiln 100, which will reduce the carbon monoxide concentration.

The controller 192 also calculates the amount of sulfur that can be converted into calcium sulfate. Sulfur can be present in the fuel burned in the burner 113 and fuel added to the slurry to form the mud. In addition, sulfur may be present in the raw material. Using the known rate of fuel consumption per ton of cement clinker and the concentration of sulfur in the fuels, the quantity of sulfur that can be converted into $CaSO_4$ is calculated by the controller 192; which takes that value to provide a set point of $SO_3$ in the end product.

Using 3% as a maximum amount of $CaSO_4$ that is acceptable in one ton of cement clinker end product, the controller 192 takes the value measured at the sulfur analyzers 193 and 194 of the amount of sulfur in the cement clinker in the form of $CaSO_4$ to determine the extent to which the $CaSO_4$ is decomposing and $SO_2$ is circulating through the system. If the $CaSO_4$ is decomposing in the system as indicated by a cement clinker sulfur content less than the needed quantity to purge the kiln 100 through sintering zone of sulfur, the controller 192 increases the exhauster's 183 speed to increase the amount of oxygen intended for the sintering zone of the kiln.

Example of the Operation of a Long Wet Process Rotary Cement Kiln Using a Raw Material not Containing Sulfur As an example of the operation of the kiln 100, the fuel used in the burner 113 and weigh feeder 102 may be petroleum coke having a calorific value of 8,000 kcal per kg and the raw material is essentially free of sulfur. If the consumption of the long wet cement rotary kiln 100 is 1,400 kcal per kg of clinker at the burner 113 and weigh feeder 102, the petroleum coke consumption will be:

$$\frac{1{,}000 \text{ kg clinker } 1{,}400 \text{ kcal/kg clinker}}{8000} = \frac{175 \text{ kg petroleum coke per}}{\text{ton of clinker}}$$

If the set point for calcium sulfate content in the cement clinker is set at 3% $SO_3$ per ton of clinker, only 30 kg of $SO_3$ can be present in 175 kg of petroleum coke, assuming all of the sulfur becomes part of the cement clinker. Therefore, the petroleum coke that can be used can contain a maximum sulfur content of:

$$\frac{30 \text{ kg SO}_3 \times 32 \text{ kg S}}{80 \text{ kg SO}_3} = 12 \text{ kg of sulfur in 175 kg of petroleum coke}$$

As a result, the petroleum coke can contain only:

$$\frac{12 \text{ kg S} \times 100 \%}{175 \text{ kg SO}_3} = 6.85\% \text{ sulfur.}$$

If coal having a calorific value of 6000 kcal per kg is used, the consumption per ton of clinker would be approximately 234 kg of coal. As a result, the coal that can be used in the kiln 100 to produce cement clinker having a maximum calcium sulfate concentration of 3.0% can have a maximum sulfur concentration of:

$$\frac{12 \text{ kg S} \times 100 \%}{234 \text{ kg coal}} = 5.10\% \text{ sulfur.}$$

However, the sulfur content values can be increased if the specification for the cement clinker permits more calcium sulfate, such as a content of 3.5%.

Other embodiments are within the scope of the claims. For example, the high sulfur fuel mixed with the slurry may have pellet diameters above 1.0 mm or below 0.5 mm and be used successfully with a reasonable amount of experimentation to determine the operating parameters. The controller may be programmed with software.

The method can be used in a semi-wet process kiln equipped with dewatering filters. The remainder of the kiln and method is the same except that the curtain chains are replaced with garland chains and garland chains also are positioned in the mud chamber. Because the semi-wet process uses a mud with approximately 18% to 20% water, fuels with higher percentage of sulfur can be used as less fuel is needed to evaporate water. Again, the content of sulfur containing compounds in the cement clinker is based on national and international standards and norms. In the semi-wet process the capacity of the kiln also will be increased by approximately 15% to 20% because the added fuel in the slurry or dewatered slurry accelerates the decarbonation process, which reduces the length of the decarbonation zone and gives more space to the other zones.

If the wet process rotary kiln is equipped with drum or disk filters and filter presses, which produce briquettes or chips having a water content of 18–20%, the same control of oxygen in the kiln by measuring the content of sulfur in the cement clinker is applicable. The course solid fuel is mixed with the slurry before dewatering. Control of the carbon monoxide levels remains the same.

What is claimed is:

1. An apparatus for producing cement clinker using a high sulfur fuel comprising:

a wet rotary kiln having a first end and a second end, the kiln being operable to process a slurry of a raw material and water received at the first end to produce cement clinker;

at least one sulfur analyzer operable to produce a measure of the sulfur content of the cement clinker;

a controller operable to receive the measure from the sulfur analyzer and to control a concentration of oxygen in the kiln based on the measured sulfur content; and a burner installed in the kiln at the second end and operable to burn a high sulfur fuel.

2. The apparatus of claim 1, wherein the high sulfur fuel contains more than approximately 4.5% sulfur.

3. The apparatus of claim 2, wherein the high sulfur fuel contains from approximately 4.5 to approximately 7% sulfur.

4. The apparatus of claim 1, further comprising an exhauster mounted to the kiln at the first end and operable to pull air through the kiln, wherein the controller is operable to control the concentration of oxygen in the kiln by controlling the speed of the exhauster based on the measured sulfur content.

5. The apparatus of claim 1, further comprising an exhauster mounted to the kiln at the first end and operable to pull air through the kiln, wherein the controller is operable to control the concentration of oxygen in the sintering zone of kiln by controlling the speed of the exhauster based on the sulfur content.

6. The apparatus of claim 1, wherein the slurry comprises approximately 35% to 40% water.

7. The apparatus of claim 1, wherein the slurry comprises approximately 18% to 20% water.

8. The apparatus of claim 1, wherein the slurry further comprises a second high sulfur fuel.

9. The apparatus of claim 8, wherein the second high sulfur fuel contains more than approximately 4.5% sulfur.

10. The apparatus of claim 9, wherein the second high sulfur fuel contains from approximately 4.5 to approximately 7% sulfur.

11. The apparatus of claim 8, wherein the kiln includes a heating zone for heating the slurry, a decarbonation zone for decarbonating the slurry and a reaction zone for reactions in the slurry, and the second high sulfur fuel combusts and burns in the kiln in the heating zone, the decarbonation zone, and the reaction zone.

12. The apparatus of claim 8, wherein the kiln includes a drying zone equipped with chains for heating and drying the slurry.

13. The apparatus of claim 8, wherein the kiln includes a sintering zone for sintering the raw material, and the oxygen provided in the kiln at the sintering zone is up to 6% in excess, whereby the temperature at which there is a decomposition reaction of calcium sulfate is raised to approximately 1500° Celsius.

14. The apparatus of claim 13, further comprising:

a carbon monoxide analyzer operable to measure the carbon monoxide concentration in the gas flowing from the exhauster, wherein the controller is operable to receive the carbon monoxide measure, to turn off the burner if the measured carbon monoxide concentration exceeds approximately 0.6%, and to maintain the carbon monoxide measure at a preset level by controlling the speed of the weigh feeder.

15. The apparatus of claim 8, further comprising:

a variable speed weigh feeder to add the second high sulfur fuel to the slurry to form a mud; and a slurry feeder to feed the mud into the kiln at the first end, wherein a speed of the weigh feeder is controlled by the controller to produce an oxidizing atmosphere.

16. The apparatus of claim 15, wherein a speed of the weigh feeder is controlled by the controller to adjust a concentration of carbon monoxide in gases exiting the kiln.

17. A method of producing cement clinker using high sulfur fuel, comprising:

introducing a slurry of a raw material and water into a wet rotary kiln;

combusting a high sulfur fuel in the wet rotary kiln;

passing the mixture through the kiln in the presence of the combusting fuel so as to sinter the raw material to form a sintered material;

measuring a sulfur content of the sintered material; and controlling an excess concentration of oxygen in the kiln based on the measured sulfur content.

18. The method of claim 17, wherein the high sulfur fuel contains more than approximately 4.5% sulfur.

19. The method of claim 18, wherein the high sulfur fuel contains from approximately 4.5 to approximately 7% sulfur.

20. The method of claim 17, further comprising feeding a second high sulfur fuel to the slurry of raw material and water to form a mud before introducing the mud into the kiln.

21. The method of claim 20, wherein the second high sulfur fuel contains more than approximately 4.5% sulfur.

22. The method of claim 21, wherein the second high sulfur fuel contains from approximately 4.5 to approximately 7% sulfur.

23. The method of claim 20, further comprising controlling a feed rate of the second high sulfur fuel added to the mixture to control the measured oxygen and carbon monoxide content of gases exiting the kiln.

24. The method of claim 20, further comprising combusting the second high sulfur fuel to consume at least a portion of the excess oxygen.

25. The method of claim 20, further comprising measuring a carbon monoxide concentration to control a feed rate of the second high sulfur fuel introduced into the kiln.

26. The method of claim 20, wherein the excess oxygen in the sintering zone of the kiln is controlled to produce a sintered material having an $SO_3$ concentration of approximately 3.5% or less, whereby the $SO_3$ concentration balances the sulfur entering the kiln in the first and second high sulfur fuels.

27. The method of claim 17, further comprising maintaining an oxidizing atmosphere in at least a portion of the kiln to reduce $NO_x$ emissions to a level below 200 mg per normal cubic meter.

28. The method of claim 17, wherein the mixture contains approximately 35–40% water.

29. The method of claim 17, wherein the mixture contains approximately 18–20% water.

30. The method of claim 17, wherein controlling the excess concentration of oxygen comprises maintaining the concentration at a level over 2%.

31. The method of claim 30, wherein controlling the excess concentration of oxygen comprises maintaining the concentration at a level of approximately 4.5 to 6%.

32. The method of claim 31, wherein controlling the excess concentration of oxygen comprises maintaining the concentration at a level of approximately 4.5 to 6% in a sintering zone of the kiln.

33. The method of claim 17, wherein the excess concentration of oxygen in the kiln is controlled to produce a sintered material having a $SO_3$ concentration less than approximately 3.5%.

34. The method of claim 17, further comprising maintaining a circulation of $SO_2$ in the kiln at less than 80 kg per hour to eliminate calcium sulfate and sulfite deposits in the interior of the wet rotary kiln.

35. The method of claim 17, further comprising reducing the concentration of $SO_2$ in the kiln by creating $SO_3$ by using calcium sulfite as an intermediate oxidizing catalyst.

36. The method of claim 17, wherein the wet rotary kiln comprises a sintering zone and controlling the oxygen concentration in the kiln comprises providing excess oxygen in at least the sintering zone to prevent decomposition of calcium sulfate below approximately 1500 Celsius.

* * * * *